United States Patent
Neto et al.

(10) Patent No.: US 11,994,108 B2
(45) Date of Patent: May 28, 2024

(54) MULTI-ROTOR WIND TURBINE OSCILLATION DAMPING

(71) Applicant: VESTAS WIND SYSTEMS A/S, Aarhus N (DK)

(72) Inventors: Julio Xavier Vianna Neto, Aarhus N (DK); Søren Dalsgaard, Hadsten (DK); Anders Yde Wollesen, Aarhus C (DK); Kim Hylling Sørensen, Aarhus C (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 747 days.

(21) Appl. No.: 17/258,430

(22) PCT Filed: Jul. 3, 2019

(86) PCT No.: PCT/DK2019/050216
§ 371 (c)(1),
(2) Date: Jan. 6, 2021

(87) PCT Pub. No.: WO2020/007431
PCT Pub. Date: Jan. 9, 2020

(65) Prior Publication Data
US 2021/0270236 A1 Sep. 2, 2021

(30) Foreign Application Priority Data
Jul. 6, 2018 (DK) .......................... PA 2018 70469

(51) Int. Cl.
*F03D 7/02* (2006.01)
*F03D 1/02* (2006.01)
*F03D 7/04* (2006.01)

(52) U.S. Cl.
CPC ............. *F03D 7/0296* (2013.01); *F03D 1/02* (2013.01); *F03D 7/0224* (2013.01);
(Continued)

(58) Field of Classification Search
CPC .......... F03D 1/02; F03D 7/0224; F03D 7/042; F05B 2240/37; F05B 2260/70; F05B 2260/964; F05B 2270/327
See application file for complete search history.

(56) References Cited

U.S. PATENT DOCUMENTS 8,123,477 B2 * 2/2012 Risager ................ F03D 7/0264
416/41
8,449,253 B2 * 5/2013 Svendsen .............. F03D 7/0244
416/31
(Continued)

FOREIGN PATENT DOCUMENTS

AU 2004316333 A1 9/2005
CN 101566136 A 10/2009
(Continued)

OTHER PUBLICATIONS

PCT International Search Report for Application No. PCT/DK2019/050216 dated Sep. 24, 2019.
(Continued)

Primary Examiner — Pedro J Cuevas
(74) Attorney, Agent, or Firm — Patterson + Sheridan, LLP

(57) ABSTRACT

A method of damping oscillations in a multi-rotor wind turbine and a wind turbine are provided. The wind turbine comprises a wind turbine support structure and at least a first nacelle with a first rotor and a second nacelle with a second rotor, at least one of the nacelles being located at a position away from a central longitudinal axis of the wind turbine support structure. The method comprises the steps of receiving and processing motion data, selecting a damping algorithm and generating a pitch control signal. The processing comprises determining at least one prominent oscillation
(Continued)

mode of the wind turbine support structure and selecting a corresponding damping algorithm.

19 Claims, 7 Drawing Sheets

(52) U.S. Cl.
CPC .......... *F03D 7/0264* (2013.01); *F03D 7/042* (2013.01); *F05B 2240/211* (2013.01); *F05B 2240/37* (2020.08); *F05B 2260/70* (2013.01); *F05B 2260/964* (2013.01); *F05B 2270/327* (2013.01)

(56) References Cited

U.S. PATENT DOCUMENTS

| | | | | |
|---|---|---|---|---|
| 9,624,906 | B2* | 4/2017 | Pineda Amo | F03D 13/22 |
| 9,719,493 | B2* | 8/2017 | Pineda Amo | F03D 7/0224 |
| 9,859,828 | B2* | 1/2018 | Tarnowski | H02J 3/28 |
| 11,098,695 | B2* | 8/2021 | Nielsen | F03D 17/00 |
| 11,692,527 | B2* | 7/2023 | Caponetti | F03D 7/045 |
| | | | | 700/287 |
| 2010/0111693 | A1* | 5/2010 | Wilson | F03D 7/0224 |
| | | | | 416/31 |
| 2010/0119369 | A1* | 5/2010 | Risager | F03D 17/00 |
| | | | | 416/1 |
| 2010/0196156 | A1* | 8/2010 | Svendsen | F03D 7/042 |
| | | | | 416/1 |
| 2014/0017083 | A1* | 1/2014 | Pineda Amo | G01C 19/02 |
| | | | | 416/37 |
| 2014/0097619 | A1* | 4/2014 | Laborda Rubio | F03D 7/0296 |
| | | | | 290/44 |
| 2015/0003984 | A1* | 1/2015 | Pineda Amo | F03D 7/042 |
| | | | | 416/43 |
| 2015/0381089 | A1* | 12/2015 | Tarnowski | H02J 3/32 |
| | | | | 290/44 |
| 2018/0017042 | A1 | 1/2018 | Baun et al. | |
| 2020/0088165 | A1* | 3/2020 | Nielsen | F03D 7/0224 |

FOREIGN PATENT DOCUMENTS

| | | |
|---|---|---|
| CN | 102644546 A | 8/2012 |
| CN | 102933842 A | 2/2013 |
| CN | 107429668 A | 12/2017 |
| CN | 107532568 A | 1/2018 |
| EP | 3101273 A1 | 12/2016 |
| GB | 2443886 A | 5/2008 |
| WO | 2016128004 A1 | 8/2016 |
| WO | 2017084676 A1 | 5/2017 |
| WO | 2017202944 A1 | 11/2017 |
| WO | 2020007431 A1 | 1/2020 |

OTHER PUBLICATIONS

PCT Written Opinion of the International Searching Authority for Application No. PCT/DK2019/050216 dated Sep. 24, 2019.
Danish Patent and Trademark Office First Technical Examination for Application No. PA 2018 70469 dated Jan. 18, 2019.
European Patent Office, Communication pursuant to Article 94(3) EPC for European Patent Application No. 19736978.8-1002, dated Nov. 9, 2022.
Chinese Patent Office, First Office Action for Chinese Patent Application No. 201980045192.9, dated Dec. 15, 2023.

* cited by examiner

MULTI-ROTOR WIND TURBINE OSCILLATION DAMPING

FIELD OF THE INVENTION

The invention relates to a method of damping oscillations in a multi-rotor wind turbine. The invention further relates to a multi-rotor wind turbine taking advantage of that method.

BACKGROUND OF THE INVENTION

Wind turbines as known in the art comprises a wind turbine tower supporting a nacelle and a rotor with a number of pitch-adjustable rotor blades. Over time, wind turbines have become larger and larger in an attempt to reduce the cost price per Mega Watt Hour (MWh) of produced electrical energy.

As an alternative to larger turbines, the power production per wind turbine tower can also be increased by equipping the wind turbine tower with multiple nacelles having smaller rotor blades. In such a multi-rotor wind turbine the nacelles are generally positioned at the distal ends of one or more support arms extending from a central tower structure. In alternative configurations, a wind turbine may comprise a V-shaped support structure on a common base, with a nacelle installed at the outer end of each support arm. Also web-like or honeycomb arrangements have been used for installing multiple nacelles in one construction.

Any wind turbine is prone to vibrations since it comprises a large mass placed at the end of a slender tower or tower structure. These vibrations include nacelle movement in the lateral direction as well as in the fore-aft direction. It is known in the art that the vibrations can be damped by actively pitching of the blades to generate counter forces to reduce the nacelle movement. In this regard, a collective adjustment of the blade pitch, where all rotor blades are adjusted by the same pitch angle, can be used to counteract oscillations in the fore-aft direction. This is accomplished by modifying the thrust force. For lateral vibrations, an individual blade pitch adjustment may be used to counteract a lateral oscillation of the tower. The individual blade pitch adjustment provides individual pitch angle settings for each rotor blade to generate a resulting lateral force.

In U.S. Pat. No. 7,692,322 a wind turbine with an active damping method is described. In this patent document, fore-aft nacelle vibrations are described to be damped by determining a collective pitch angle adjustment for generating a thrust on the rotor blades so as to cancel out the vibrations of the nacelle. The collective pitch angle adjustment is based on a speed estimation of the nacelle movement, as determined from a detected acceleration signal in the fore-aft direction.

In multi-rotor wind turbines, similar fore-aft nacelle vibrations do occur. However, just applying the known methods of oscillation damping may not be sufficient for counteracting all such vibrations in a multi-rotor turbine. The provision of heavy nacelles and rotors at the outer ends of long arms extending from the wind turbine tower results in new vibration modes and requires new strategies for counteracting all vibrations.

There is therefore a need to provide a method of damping oscillations that also works for a multi-rotor wind turbine.

SUMMARY OF THE INVENTION

According to the invention this object is achieved by providing a method of damping oscillations in a multi-rotor wind turbine, the wind turbine comprising a wind turbine support structure and at least a first nacelle with a first rotor and a second nacelle with a second rotor, at least one of the nacelles being located at a position away from a central longitudinal axis of the wind turbine support structure. The method comprises the steps of receiving motion data representing a movement of the first nacelle and of the second nacelle, processing the received motion data to determine at least two prominent oscillation modes of the wind turbine support structure, for each prominent oscillation mode select a corresponding damping algorithm, based on each one of the selected damping algorithms and the received motion data, generate a partial pitch control signal for a pitch controller of at least one of the rotors, combining the generated partial pitch control signals into a combined pitch control signal for the pitch controller of the at least one of the rotors, and based on the combined pitch control signal, instructing the respective pitch controller to adapt a pitch of the at least one of the rotors. The inventors have realized that by properly isolating the different vibrational modes from the mixed motion data signal and by selecting the appropriate damping algorithms for the different modes, multiple vibration modes can be counteracted at once by providing just one combined pitch control signal to each pitch controller.

One problem with detecting and attempting to attenuate oscillations in a multi-rotor wind turbine is that in addition to the already known fore-aft tower oscillation, there are also additional modes of vibration that do not occur in single rotor wind turbines. For example, thrust forces on the rotors at the rotor arm ends may cause tower torsion and torsional vibrations in the wind turbine support structure, at or adjacent to the point where the arms are attached. The different vibrational modes, with different amplitudes, phases and frequencies together result in a complex and blurry motion data signal and make it difficult to just apply the known methods for oscillation damping in single rotor wind turbines. The method according to the invention provides the ability to differentiate between the various vibrational modes in the mixed motion data signals, to distinguish between prominent oscillation modes that have to be dealt with and less prominent oscillation modes that add noise to the motion data signals we're more interested in. As a result the rotor pitch of one or more rotors can be controlled in such a way as to specifically address the main cause of the unwanted oscillations. It is important to use oscillation mode specific damping algorithms because the same pitch adjustments may have entirely different results on the vibrational motions of the wind turbine support structure.

It is noted that the central longitudinal axis will generally coincide with the central longitudinal axis of a wind turbine tower. In wind turbine support structures not having an upright central tower, the central longitudinal axis is defined relative to the base of the support structure.

In addition to motion data from the different nacelles, the method according to the invention may further take advantage of motion data representing a movement of the wind turbine support structure. The motion data may comprise position data, velocity data and/or acceleration data. For example, GPS devices, accelerometers and/or gyroscopes may be used for measuring such motion data. Alternatively, strain gauges in the tower base or at the point of attachment of the rotor arm to the wind turbine support structure may provide data signals that are representative of the monitored oscillations.

In a configuration with two rotor arms being attached to the wind turbine support structure, the first nacelle and the second nacelle being carried by the respective rotor arms, the motion data may comprise acceleration signals from accelerometers associated with the respective nacelles. In this exemplary configuration, the prominent oscillation mode may be determined to be a tower torsion mode and the corresponding damping algorithm for the tower torsion mode may at least include subtracting the acceleration signal of the first nacelle from the acceleration signal of the second nacelle. This specific way of processing the motion data turns out to be very useful for accurately determining and/or damping torsional vibrations. The inventors have realised that in the fore-aft tower oscillating motion, both nacelles move in phase. In the torsional oscillating motion, both nacelles oscillate with a 180° phase difference. Subtracting the acceleration signal of the first nacelle from the acceleration signal of the second nacelle cancels out the fore-aft vibrations and amplifies the torsional vibration. With the thus obtained tower torsion signal, pitch corrections for the two nacelles are then generated for counteracting these torsional vibrations.

When, in a wind turbine of the same configuration, the prominent oscillation mode is determined to be a tower fore-aft mode, the corresponding damping algorithm for the tower fore-aft mode may at least include summing the acceleration signal of the first nacelle and the acceleration signal of the second nacelle. Because of the phase difference of the two detected torsional vibrations in both nacelles, adding the two signals may completely cancel out these torsional vibrations, thereby isolating the remaining vibrational modes, such as the for-aft tower oscillation.

In an advantageous embodiment two prominent oscillation modes are determined as a tower torsion mode and as a tower fore-aft mode. In this situation, a first partial pitch control signal for the corresponding damping algorithm for the tower torsion mode at least includes subtracting the acceleration signal of the first nacelle from the acceleration signal of the second nacelle, and a second partial pitch control signal for the corresponding damping algorithm for the tower fore-aft mode at least includes summing the acceleration signal of the first nacelle from the acceleration signal of the second nacelle. Thus by creating a difference signal and a sum signal of the acceleration signals, two prominent oscillation modes can be mitigated in a simple manner.

In an embodiment, the determination of the prominent oscillation modes is done by the subtraction and/or addition of the acceleration signals in combination with a decision step, where it is determined that the if the signal content in the difference signal and/or summation signal is above a certain or predefined threshold, then the oscillation modes are determined as being present.

In order to analyse and dampen the vibrations of the separate oscillation modes, the generating of the pitch control signal may include applying a frequency filter based on a frequency window characteristic for the prominent oscillation mode of the respective damping algorithm. In embodiments more than one frequency filter may be added to target different signal aspects.

Advantageously the frequency filter is applied after the subtraction of the acceleration signals and after the summation of the acceleration signals. In a situation where the tower torsion mode and the tower fore-aft mode are closely spaced in frequency, the partial pitch signals can be determined without use of frequency filtering, and thereby avoiding mixing frequency content in the signals between the modes, in particular avoid mixing signal content with different phases.

The wind turbine may be a four-rotor wind turbine in which, a first and a second rotor arm are attached to the wind turbine support structure at a first vertical level, the first nacelle and the second nacelle being carried by the respective rotor arms, while a third and a fourth rotor arm are attached to the wind turbine support structure at a second vertical level, a third nacelle with a third rotor and a fourth nacelle with a fourth rotor being carried by the respective rotor arms. The first prominent oscillation mode is determined to be a first level tower torsion mode. The second prominent oscillation mode is determined to be a second level tower torsion mode. The frequency window characteristic for the first level tower torsion mode is different from the frequency window characteristic for the second level tower torsion mode. So although the method may analyse the same type of torsional vibrations for both sets of rotor arms, the selected damping algorithms are different for different levels of the wind turbine. By tuning the damping algorithms to the oscillation frequencies typical for the respective vertical positions on the wind turbine support structure, the damping performance of the method is further improved.

An embodiment of the method according to the invention may further comprise the steps of for each prominent oscillation mode determining a respective oscillation mode level, comparing the determined oscillation mode levels to respective oscillation mode thresholds, generating a shutdown request for shutting down the nacelles if at least one of the oscillation mode levels exceeds the oscillation mode threshold, and sending the shutdown request to the pitch controllers of the rotors. In special circumstances in which even the method according to the invention is not enough to avoid excessive vibrations in the wind turbine, the risk of permanent damage to the wind turbine and or one of its rotors may be too large. In such situations, pitching out the rotor blades to shut down the power production may be the safest option. Instead of a full shutdown, the rotors may be derated to a power output level that is expected to bring the wind turbine back to safer level of vibrations. For example, the rotors may be derated to 50% of their nominal power output. Also derating is generally done by adjusting the pitch of the rotor blades. Different thresholds may be used for different vibrational modes. When only one oscillation mode level is above the threshold, a shutdown or derating may be needed for safety, but a shutdown or derating may also be initiated when two or more oscillation mode levels approach their respective thresholds and/or exceed a second, lower, threshold.

According to a further aspect of the invention, a multi-rotor wind turbine is provided comprising a wind turbine support structure, a first nacelle with a first rotor and a first pitch controller, operatively coupled to the first rotor for controlling the pitch thereof, a second nacelle with a second rotor and a second pitch controller, operatively coupled to the second rotor for controlling the pitch thereof, at least one of the nacelles being located at a position away from a central longitudinal axis of the wind turbine support structure, and an oscillation control unit. The oscillation control unit is operably coupled to the first and the second pitch controllers and is configured to perform all methods according to the invention.

Each nacelle may comprise an oscillation sensor for generating the motion data, and the oscillation sensor may be operatively coupled to the oscillation control unit for sending the motion data thereto. Additionally, the multi-rotor wind turbine may comprise a tower oscillation sensor, provided at the wind turbine support structure for generating the motion data based on mechanical oscillations of the wind turbine support structure. Also the tower oscillation sensor is operatively coupled to the oscillation control unit for sending the motion data thereto.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

For a better understanding of the invention, some embodiments of the invention will now be described with reference to the following drawings, in which.

DETAILED DESCRIPTION

Figure 1:
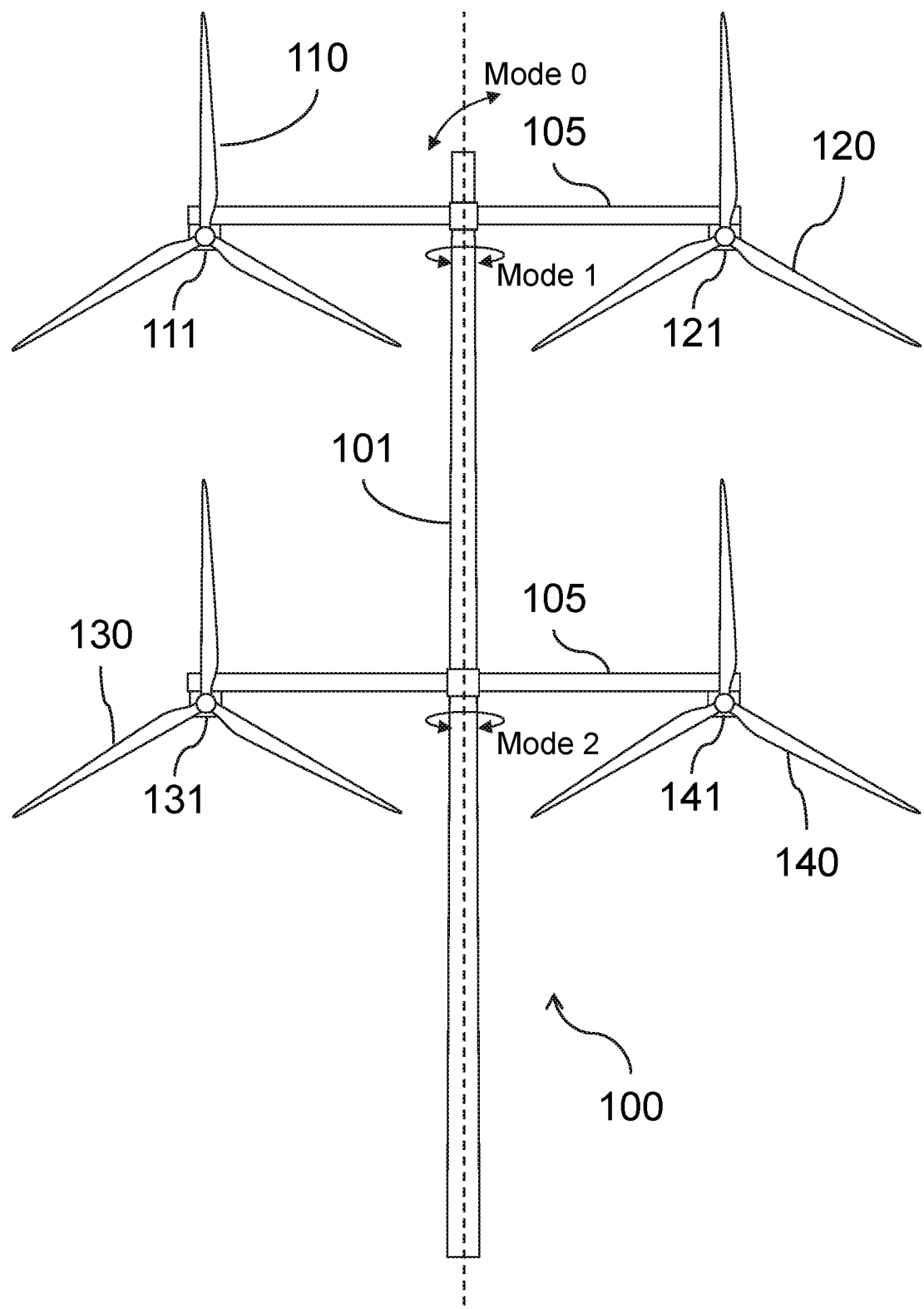
FIG. 1 schematically shows a multi-rotor wind turbine in which the method according to the invention may be implemented.

FIG. 1 schematically shows a multi-rotor wind turbine 100 in which the method according to the invention may be implemented. The currently most common type of wind turbine is the horizontal axis wind turbine (HAWT). It usually has a nacelle placed on top of a high vertical pole, with the rotor blades attached to a horizontal low speed shaft that extends from the nacelle. The nacelle may comprise a gear box for coupling the low speed shaft to an also horizontal high speed shaft that is connected to the generator. Power generated by the generator is transported to the ground by a power line running through the core of the pole, where it can be used or stored immediately or be coupled to a larger power grid. Where, in the past, wind turbines and their rotor blades have grown bigger and bigger to satisfy the increasing demand for wind powered electricity, recently also another strategy has been introduced; the multi-rotor wind turbine 100. Instead of one nacelle with one rotor on the top of the pole, this multi-rotor wind turbine 100 comprises two or more nacelles, here shown with four nacelles 111, 121, 131, 141, each carrying their own rotor 110, 120, 130, 140. In order to avoid the rotor blades of different rotors 110-140 running into each other, the nacelles 111-141 are spaced from each other by attaching them to arms 105, originating from the pole. In this example, the four rotors are arranged in two layers, and each layer can be yawed independently. While in the current examples all four rotors 110-140 rotate in the same vertical plane, it is also possible to put one or more rotors in different planes. In the following exemplary embodiments, the multi-rotor wind turbine 100 has two or four rotors 110-140. It is, however, to be noted that a multi-rotor wind turbine, may alternatively comprise 3, 5, 6 or more rotors. In alternative configurations, a wind turbine may comprise a V-shaped support structure on a common base, with a nacelle installed at the outer end of each support arm. Also web-like or honeycomb arrangements have been used for installing multiple nacelles in one construction.

FIG. 1 further shows three different oscillation modes that may occur in this wind turbine 100. Mode 0 is a fore-aft bending motion of the wind turbine tower 101. This fore-aft bending takes place in a direction parallel to the wind direction, i.e. perpendicular to the planes of rotation of the four rotors 110-140. The fore-aft bending causes all four rotors 110-140 to move backward and forward simultaneously and in phase. The two lower level rotors 130, 140 move back and forth with the same frequency as the lower level rotors 110, 120, albeit with a smaller amplitude.

Mode 1 is a torsional vibration around the central longitudinal axis of the wind turbine tower 101. The torsional vibration causes the two rotors 110, 120 at the upper level to move in opposite directions. When the first rotor 110 moves forward, the second rotor 120 moves backward, and vice versa. Mode 2 also is a torsional vibration around the central longitudinal axis of the wind turbine 100, but at a lower vertical level. The amplitude, phase and frequency of the mode 2 torsional tower oscillations may, and generally will, differ from the mode 1 torsional tower oscillations. The actual motion pattern of each individual rotor 110-140 is influenced by multiple oscillation modes. When using sensors to detect these motion patterns, a complex mixed oscillation signal is measured, making it difficult to analyse and control the oscillatory motion.

Example of other modes include movement of the lower layer while the top layer is not, or only to a lower extent, moving. That is the first tower vibration mode. Embodiments of the present invention may also attack such vibrational modes by upon determination that the mode is a prominent oscillation mode, select a corresponding damping algorithm.

Figure 2:
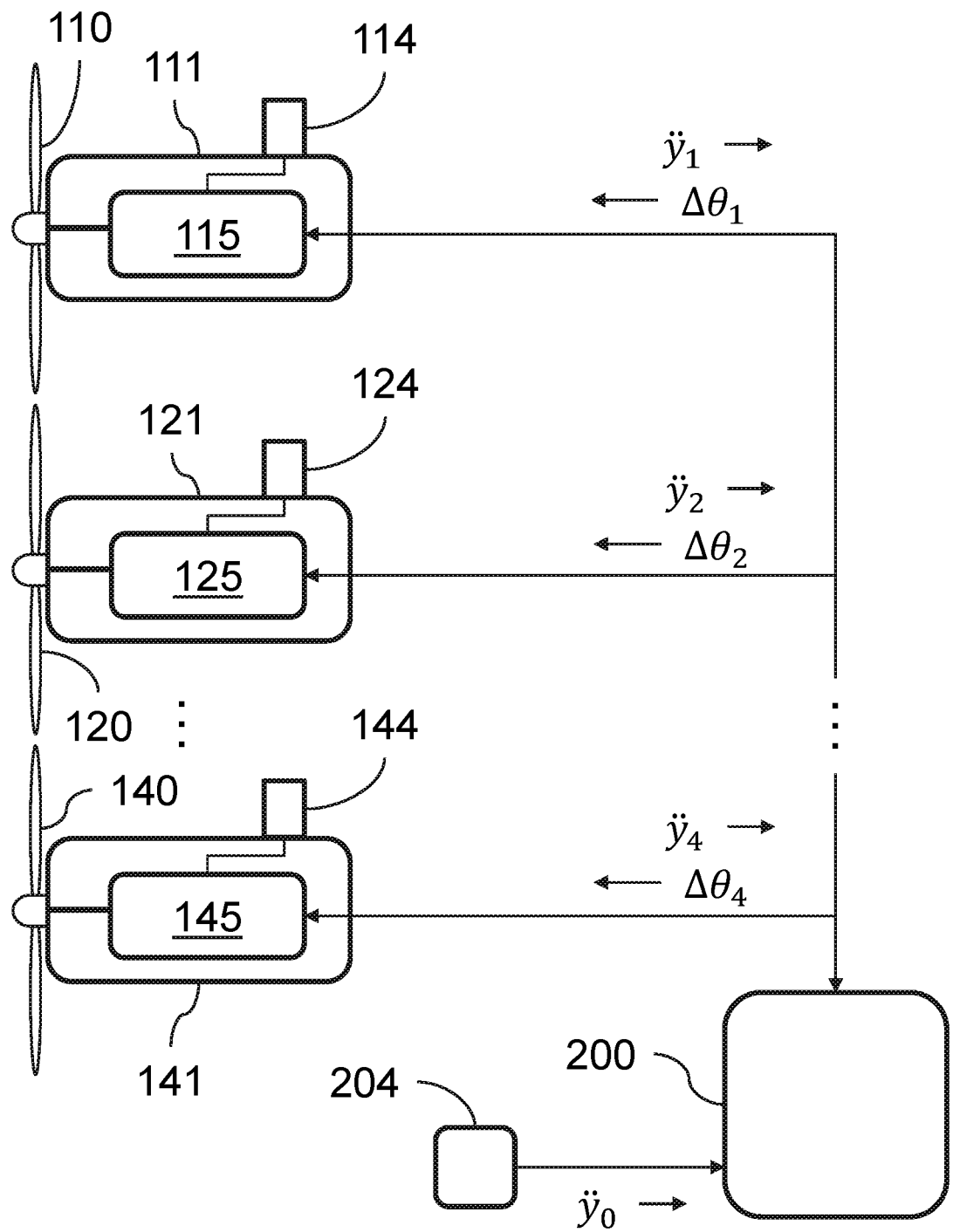
FIG. 2 shows a schematic representation of some functional parts of the multi-rotor wind turbine.

FIG. 2 shows a schematic representation of some functional parts of the multi-rotor wind turbine 100. For conciseness only, the third rotor 130 is omitted. In a similar manner, the wind turbine also works with two, three, five or more rotors. Each rotor 110, 120, 140 is electronically coupled to a respective production controller 115, 125, 145. Each production controller 115-145 is operable to receive sensor readings from all types of sensors useful for the optimized control of the wind turbine 100. Such sensor readings may represent (and are not limited to) wind speed, speed of rotation, gear box settings, pitch angle, yaw angle and power output. Depending on what they are actually measuring, the sensors may, e.g., be installed on the rotor blades, in the rotor hub, in the gearbox or the generator or on a brake or rotor shaft. Wind speed, for example, may be measured centrally with only one wind sensor or at each rotor separately using one or more wind speed sensors installed on each rotor.

An important sensor for the current invention is the accelerometer 114, 124, 144. Each nacelle 111-141 comprises at least one accelerometer 114-144 for measuring the motion of the respective nacelle 111-141. The acceleration data obtained by the accelerometers 114-144 is fed to the respective production controllers 115-145 and from there sent to a central oscillation control unit 200. Alternatively, the acceleration data is sent to the oscillation unit 200 directly. The acceleration data may be measured in one direction only, preferably in a horizontal plane and in a direction perpendicular to the rotor arm 105 to which the respective nacelle 111-141 is attached. Preferably, the acceleration data represents both the amount and the direction of the acceleration of the accelerometer 114-144. It is noted that the accelerometers 114-144 are just one example of the types of sensors that may be used for putting the current invention into practice. Instead of, or in addition to, the accelerometers 114-144, GPS information may be used for determining positions, speed and/or acceleration of the nacelles 111-141 or other parts of the wind turbine 100. All such sensors may be placed at or near the nacelles 111-141, but also at different positions on the rotor arm 105, or even on the wind turbine tower 101. In principle, any wind turbine part that moves due to the tower oscillations is a suitable mounting point for such sensors.

Also gyroscopic devices or strategically placed stain gauges may provide information about vibration induced motion. The strain gauges may, for example, be placed in the tower base or at the connection points between the wind turbine tower 101 and the rotor arms 105 supporting the nacelles 111-141. Strain gauges, used for this purpose, can also be placed at different levels, e.g. somewhere in between the upper and connection points.

The production controller 115-145 processes, and optionally stores, all the incoming information and adjusts control settings like desired pitch angle, yaw angle and speed of rotation in such a way to control and optimize the power output of the rotor 110-140. Specific examples of control strategies are described below with reference to FIGS. 3 and 4.

It is to be noted that the production controller 115-145 is not necessarily a single unit harbouring all control functions of the wind turbine 100. Separate control functions may be provided by separate control units For example, a pitch control system may be provided in the rotor hub, close to the pitch control mechanism, and a central controller and a yaw control unit at two separate locations in the nacelle. In this schematic representation, the production controllers 115-145 are situated inside the respective nacelles 111-141 of their rotors, but alternative setups are foreseeable. For example, a central control unit may be provided for controlling the power production of each one of the rotors 110-140, or all data may be communicated wirelessly to a cloud server that processes the incoming data and returns control Instructions via the same or a similar communication signal.

Oscillation control unit 200 receives the acceleration data ($\ddot{y}_1$, ..., $\ddot{y}_4$) from the accelerometers 114-144 of all nacelles 111-141 and based thereon determines the rotor pitch adjustments ($\Delta\theta_1$, ..., $\Delta\theta_4$) needed for counteracting the different oscillation modes in the tower structure 101. Optionally, additional acceleration data ($\ddot{y}_0$) from an accelerometer 204 in the wind turbine tower 101 is also used as input for the oscillation control. The oscillation control unit 200 may be provided at a central location in the tower 101 or the tower base of the wind turbine. Alternatively, the oscillation control unit 200 is provided in one of the nacelles, centrally in the wind turbine park or at a remote location. The functionality of the oscillation control unit 200 may be distributed over multiple controllers at different locations and/or be embodied in one or more controllers that are already present for other purposes.

Figure 3:
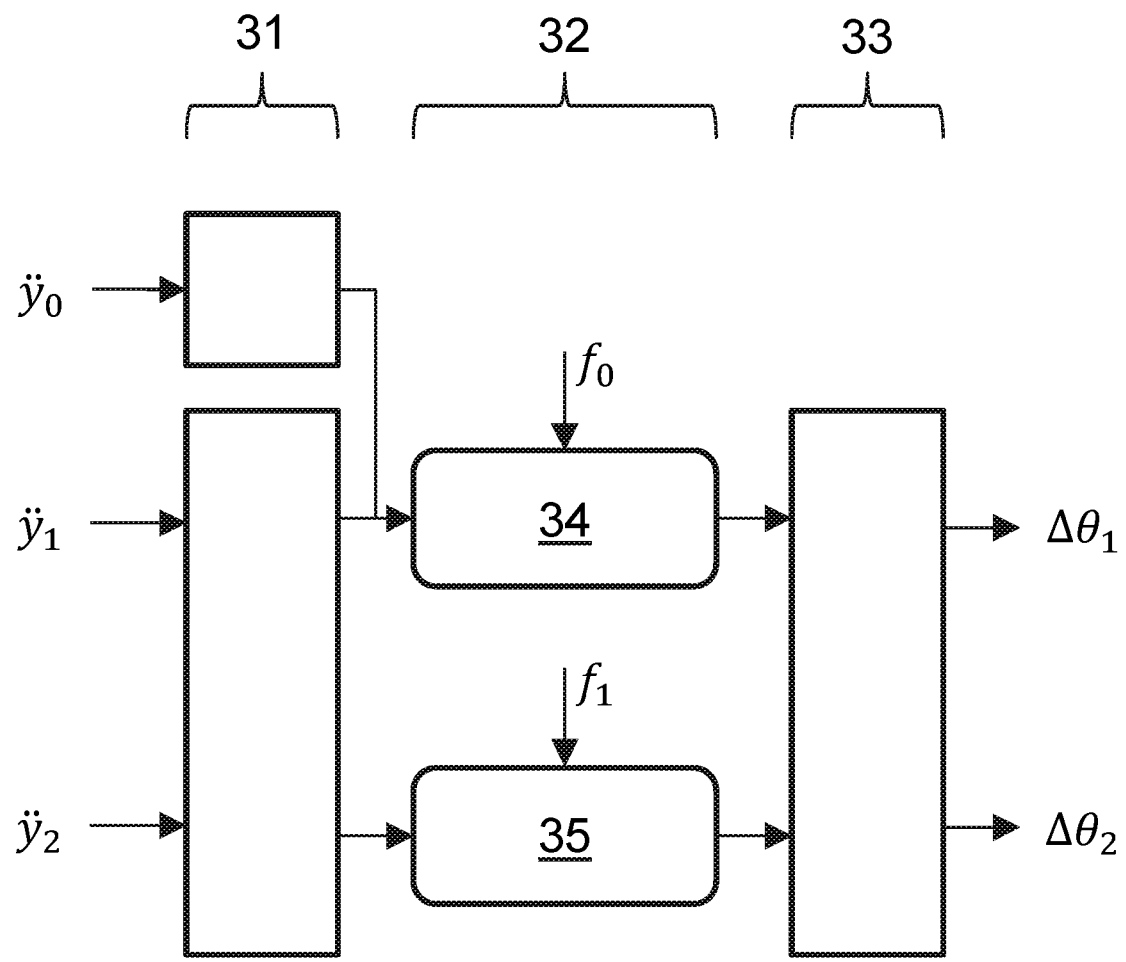
FIG. 3 shows a high level flow chart of the signal processing occurring in a method according to the invention.

FIG. 3 shows a high level flow chart of the signal processing occurring in a method according to the invention. The exemplary method shown here makes use of acceleration data, such as for example supplied by or derived from accelerometers or GPS location data. For this example, we assume a simple two rotor wind turbine with one wind turbine tower and two rotor arms. Each rotor arm carries a nacelle with a rotor.

The method of FIG. 3 comprises three stages 31, 32, 33. In a mode isolation stage 31, the oscillation control unit receives the acceleration data from the two nacelles ($\ddot{y}_1$, $\ddot{y}_2$) and optionally also from an acceleration sensor in the wind turbine tower itself ($\ddot{y}_0$). This data may be filtered in order to improve the quality of the raw acceleration signal before entering the second stage, which is a modal control stage 32. In embodiments, the signal filtering at this stage is done in a manner which does not, alter the frequency content of the signal. At this stage 32, input data is analysed to determine which oscillation modes are currently present in the wind turbine and may need to be counteracted. Different oscillation mode specific modules 34, 35 may be used for analysing different oscillation modes. Many of such analysis modules 34, 35 may include frequency specific filters for filtering out noise and other signals that are not needed for determining the vibrations in the respective specific oscillation modes. The eventual result of this modal control stage 32 is vibration data representing the current oscillation mode level of the different vibrational modes, e.g. in the form of phase and amplitude signals or simply as instantaneous amplitude signals.

Because of the pre-processing that already took place in the mode isolation stage 31, different oscillation mode specific modules 34, 35 may receive different motion data input signals. In this example, two different vibrational modes are distinguished and the modal control stage 32 uses two oscillation mode specific modules 34, 35. A tower fore-aft oscillation module 34 uses the tower acceleration ($\ddot{y}_0$) and/or the sum of the acceleration signals ($\ddot{y}_1$, $\ddot{y}_2$) of the two nacelles to determine the amplitude of the fore-aft tower movement. When this amplitude exceeds a certain base level, it will be forwarded to the third stage, i.e. a combination stage 33. This base level may be zero, meaning that also vibrations with very low amplitude will be counteracted. It may, however, be more efficient and more practical to only compensate for more prominent oscillation modes. Fore-aft tower vibrations will generally have a fixed frequency that is characteristic for the wind turbine. This frequency ($f_0$) depends, e.g. on the tower dimensions, shape and weight, the materials used for the tower and other parts and the rotor arm construction and nacelle placement. When, e.g., rotor arms, nacelles or rotor blades are removed from the wind turbine, this frequency ($f_0$) may change and the fore-aft oscillation module 34 may have to be adapted accordingly. The combination stage 33 combines the outputs from the different oscillation mode specific modules and generates pitch adjustment signals ($\Delta\theta_1$, $\Delta\theta_2$) for the individual production and/or pitch controllers of the different rotors. Production controllers are generally configured to maximize the energy production of the wind turbine by calculating the optimal pitch angles for the rotor blades in dependence of the wind speed. The optimal pitch angles are then used as input signals for a pitch controller that controls the actual pitch adjustment mechanism. When the theoretically optimal pitch control settings lead to prominent oscillation modes, the pitch adjustment signals ($\Delta\theta_1$, $\Delta\theta_2$) obtained through the method shown in FIG. 3 are used by the production controller and/or the pitch controller to adjust the rotor pitch of the respective rotors such as to counteract the oscillations while maintaining high energy production rates.

The method of FIG. 3 comprises three stages 31, 32, 33. As described before acceleration data ($\ddot{y}_1$, $\ddot{y}_2$) is received from two motion sensors which may be installed in or at the nacelles 111, 121 or elsewhere on the rotor arms to determine a movement of the wind turbine support structure (101). Typically, the sensors will be installed symmetrically, i.e. at equal distances from wind turbine tower. Optionally also motion data ($\ddot{y}_0$) from an acceleration sensor in the wind turbine tower itself is used as input.

If the accelerometers on both rotor arms are placed at equal distances from the wind turbine tower, e.g., both at the nacelle or halfway between the nacelle and the tower, the mode 0 vibration level may be isolated by summing the sensor signals ($\ddot{y}_1$, $\ddot{y}_2$) from both sensors. When summing the two signals, the tower torsion components will cancel each other out. Similarly, subtracting one signal from the other will remove the fore-aft tower bending component, thereby isolating the mode 1 component. The signal ($\ddot{y}_0$) from the motion sensor located at the wind turbine tower itself does not have a tower torsion component (assuming that it is installed close to the longitudinal axis of the tower) and can be used for improving the accuracy of the isolated mode 0 vibration level signal.

When the sensors are placed at different distances from the wind turbine tower, their respective distances to the tower has to be taken into account when isolating the different modes. In a reliable approximation wherein it is assumed that the arms are rigid, the sensor signal from an accelerometer at one rotor arm can be expressed as $S_1=B-L_1*A$. Wherein B is the acceleration (m/s$^2$) due to the mode 0 vibrations. The same acceleration will be experienced at all positions along the rotor arms and also by a tower based accelerometer located at the same height as the rotor arms. $L_1$ depicts the distance (m) between the first sensor and the central longitudinal axis of the support structure. A is the torsional acceleration (rad/s$^2$) due to the mode 1 vibrations. This torsional acceleration measured in rad/s$^2$ is the same for both sensors, but its contribution to the sensor signal increases when moving further away from the longitudinal axis. At the other sensor, A and B are the same, but the contribution of the torsional acceleration to the sensor signal works in the opposite direction; $S_2=B+L_2*A$. From these two sensor signals, the actual mode 0 and mode 1 acceleration components can be derived; $A=(S_2-S_1)/(L_1+L_2)$ and $B=S_1+L_1(S_2-S_1)/(L_1+L_2)$. Mode 0 and mode 1 vibration levels could in a similar way be derived from position or velocity data. More than two sensors may be used in combination with some averaging, regression or fitting function for further improving the accuracy of the determining of the vibrational mode level.

Figure 4:
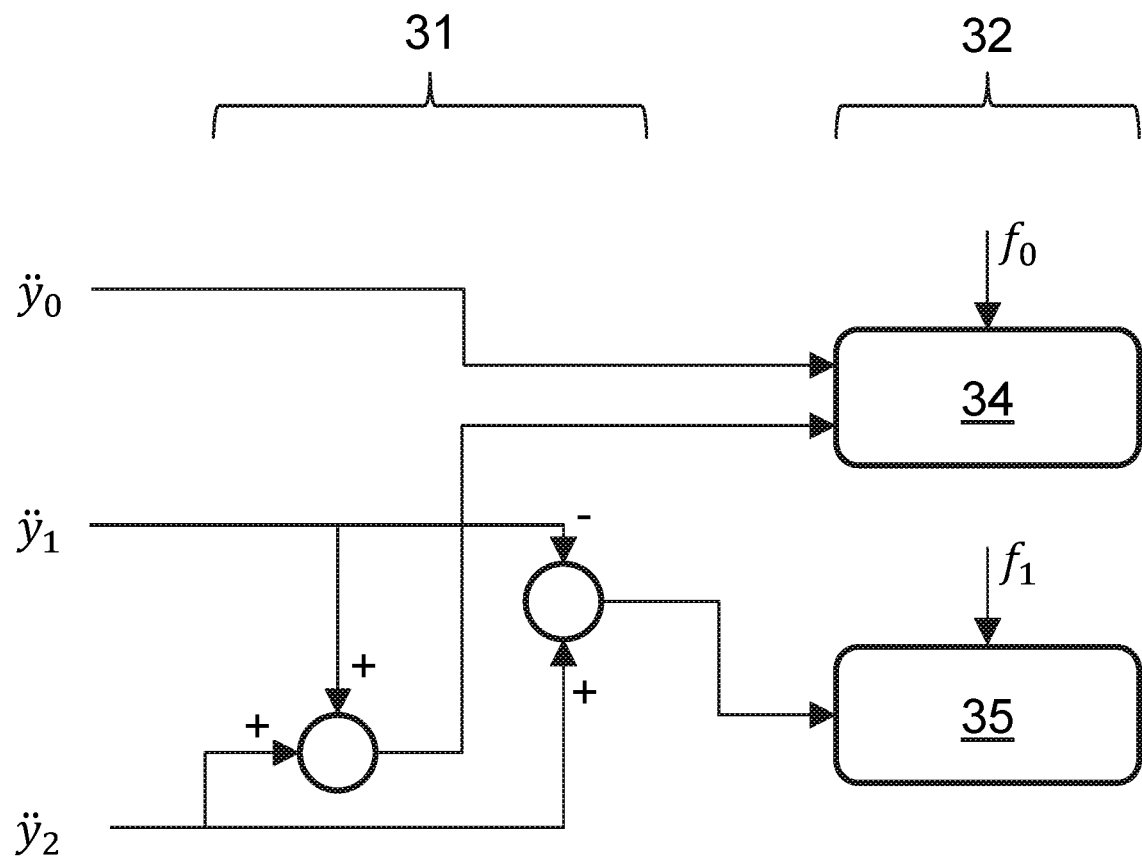
FIGS. 4 and 5 schematically show the mode isolation and data processing of FIG. 3 in more detail.
Figure 5:
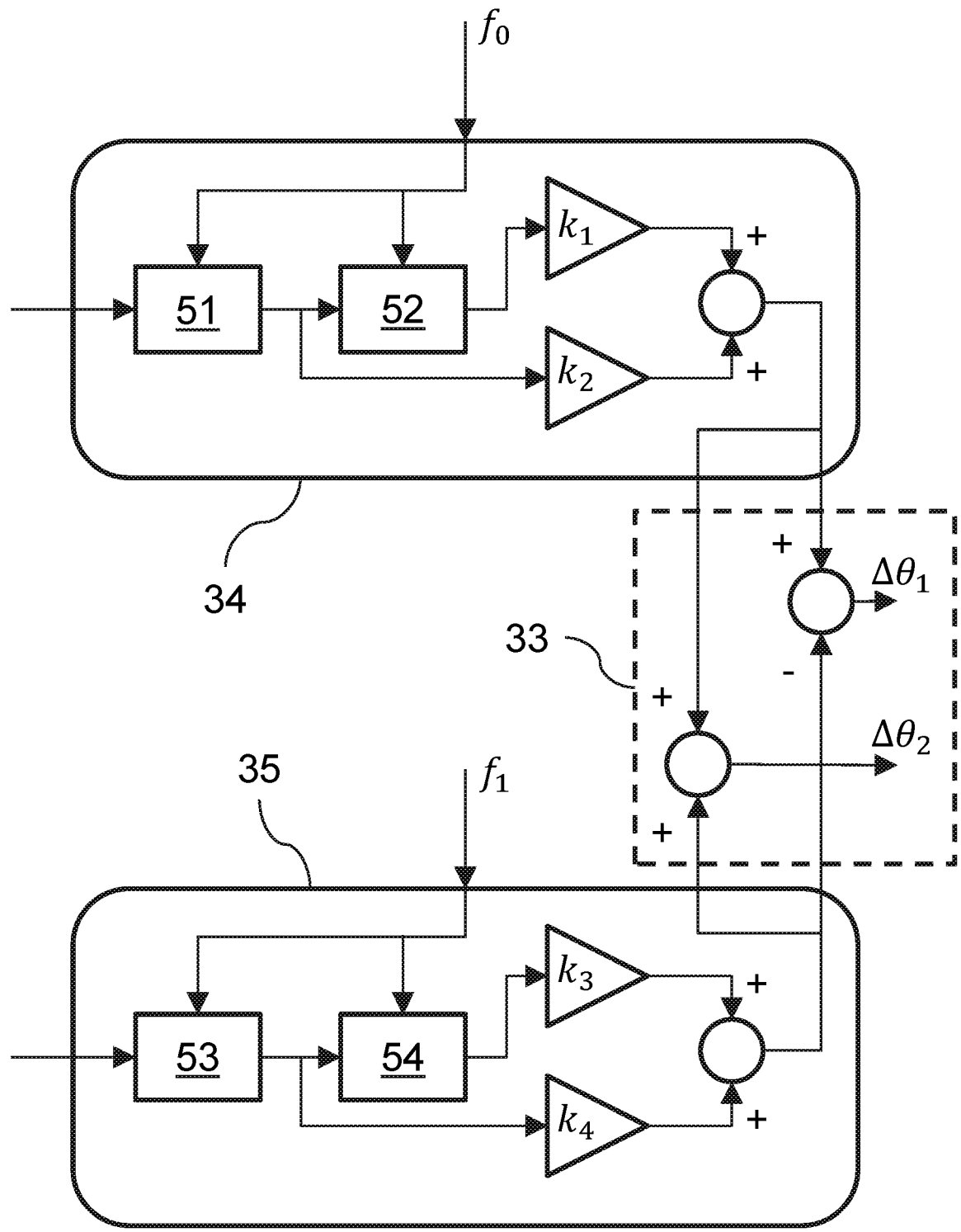

FIGS. 4 and 5 schematically show the mode isolation and modal control stages 31, 32 of FIG. 3 in more detail. For this example, a wind turbine with only two arms at the same vertical level is used, but similar principles apply to wind turbines with more and/or differently arranged rotors. Here, each rotor arm has a nacelle installed near its distal end. Acceleration sensors are used to measure the acceleration in the tower itself ($\ddot{y}_0$) and in the two nacelles ($\ddot{y}_1$, $\ddot{y}_2$). Acceleration may be measured in three dimensions, but the direction of the oscillations that are counteracted using the here described damping algorithms will be parallel with the wind speed.

In the modal control stage 32, separate data processing modules are used for analysing fore-aft and torsional oscillations of the wind turbine tower 101. The fore-aft analysis module 34 uses the tower acceleration ($\ddot{y}_0$) and/or a sum of the acceleration signals ($\ddot{y}_1$, $\ddot{y}_2$) of the two nacelles as separate input signals to determine the amplitude of the fore-aft tower movement. Alternatively, all three acceleration signals ($\ddot{y}_0$, $\ddot{y}_1$, $\ddot{y}_2$) are summed or averaged to provide only one input signal to the fore-aft analysis module, or each sensor signal is processed separately. For all three acceleration signals ($\ddot{y}_0$, $\ddot{y}_1$, $\ddot{y}_2$), the amplitude will depend on the vertical position of the sensors. Closer to the top of the wind turbine tower 101, the amplitude is larger. Depending on the stiffness of the rotor arms 105, the amplitude at the nacelle may be similar to the amplitude at the tower 101 (stiff arms), or the nacelles may oscillate with a larger range of motion than the tower 101 (more flexible arms).

The measured acceleration signals from the different acceleration sensors, for as far as caused by fore-aft tower oscillations, are generally in phase. Summing the signals ($\ddot{y}_1$, $\ddot{y}_2$) from the two nacelles provides an advantage over processing said signals separately. The summing helps to cancel out the acceleration contributions that are caused by torsional oscillations in the wind turbine tower 101. Torsional tower oscillations accelerate the two nacelles in opposite directions. When one nacelle accelerates forward, the other accelerates backward. When summing the signals ($\ddot{y}_1$, $\ddot{y}_2$) from both sensors, the acceleration contributions from the torsional tower oscillation are cancel out and the total amplitude of the summed signal is representative of the tower acceleration due to fore-aft oscillation. The summed signal may be divided by two to calculate an average acceleration signal, but the absolute value of the signal is not very relative. Signal gains will have to be calibrated later anyhow for ensuring that the correct amount of pitch adjustment is applied.

The tower acceleration ($\ddot{y}_0$) signal is not very useful for analysing torsional oscillations in the wind turbine tower 101. Strain gauges in the tower 101 can be used for analysing tower torsion. The torsional analysis module 35 bases its analysis on a difference between the acceleration signals ($\ddot{y}_1$, $\ddot{y}_2$) of the two nacelles. By subtracting these two acceleration signals ($\ddot{y}_1$, $\ddot{y}_2$) the acceleration caused by the fore-aft motion is removed from the signal. The resulting signal is therefore very suitable for analysing the torsional oscillations, even when the wind turbine tower is swinging back and forth due to a large fore-aft oscillation.

Both signal analysis modules 34, 35 may use frequency specific filtering for further improving their ability to single out only the relevant type of oscillation. For a specific build of the wind turbine (structure, size, materials, weight . . . ), the different oscillation modes will have specific characteristic frequencies or frequency ranges that will usually differ per oscillation mode. Here, the mode 0 fore-aft tower oscillation has a characteristic frequency $f_0$ and the mode 1 tower torsion oscillation has a characteristic frequency $f_1$. These characteristic frequencies are used as input for the respective signal analysis modules 34, 35. When the wind turbine structure is changed, e.g. by removing one or more of the nacelles, these frequencies ($f_0$, $f_1$) may change. Also external factors like, e.g., ice formation on the rotor blades may influence the characteristic frequencies ($f_0$, $f_1$). The characteristic frequencies ($f_0$, $f_1$) may be predetermined and only adaptable via a software update. Alternatively, the control software includes algorithms for calculating the characteristic frequencies ($f_0$, $f_1$) based on other variables. In an even more advanced embodiment, the characteristic frequencies ($f_0$, $f_1$) are automatically derived from the oscillation sensor data.

FIG. 5 shows the data processing and combination stages 32, 33 in more detail. As apparent from the schematic representation of the data processing algorithms, signal analysis modules 34, 35 work in a similar way. The main difference between the two analysis modules 34, 35 is the input signals that is analysed and the characteristic frequency ($f_0$, $f_1$) that is used. Also the gains applied to the signals at the various stages of the data processing may be adapted for the specific oscillation mode the signal analysis module 34, 35 is analysing.

Because the two signal analysis modules work in substantially the same way, only the fore-aft tower oscillation analysis module 34 is now described in detail. It is to be noted that alternative signal processing schemes may be employed. Signal processing blocks may be added, removed, rerouted or replaced as long as the overall result is that the input signals are converted to pitch adjustment signals that can be used for counteracting the unwanted tower oscillations. Of course, when using different types of input signals (velocity or position signals, strain gauges) the signal processing modules 34, 35 are to be adapted accordingly.

When the input signal, representing acceleration in a direction parallel to the wind speed, enters the signal analysis module 34, some initial amplification and/or filtering (not shown) may take place before being fed to a first integrator stage 51 that converts the acceleration signal into a velocity signal. The first integrator stage 51 may be implemented as a leaky integrator and low pass filter, using the characteristic frequency $f_0$ of the fore-aft oscillation for filtering out background noise, DC components, and signal component representing different oscillation modes. The output of the first integrator stage is then led to a subsequent second integrator stage 52 that converts the velocity signal into a position signal. Also the second integrator stage 52 may be implemented as a leaky integrator and low pass filter, using the characteristic frequency $f_0$ of the fore-aft oscillation for filtering out background noise and signal component representing different oscillation modes. The velocity signal is suitable for damping the oscillation and the position signal for correcting for the stiffness of the rotor arms. Both correction signals are amplified with respective predetermined gain factors ($k_1$, $k_2$) and summed to together form one combined pitch adjustment signal. In a similar way, the tower torsion analysis module 35 provides a pitch adjustment signal.

Pitch controllers of the two nacelles calculate an optimal rotor blade pitch in order to maximize the energy production at a given wind speed. The pitch adjustment signals are used to adjust the thus determined optimal rotor blade pitch in order to counteract the unwanted oscillations. For these adjustments, the calculated pitch adjustments for the fore-aft and tower torsion oscillations are just both added to the not yet adjusted rotor blade pitch value. For counteracting the fore-aft oscillations, the pitch of both rotors is adjusted in the same direction. For counteracting the tower torsion, the pitch of both rotors is to be adjusted in opposite directions. Therefore, the pitch adjustment signal from the tower torsion analysis module 34 is inverted for one of the two rotors only.

Figure 6:
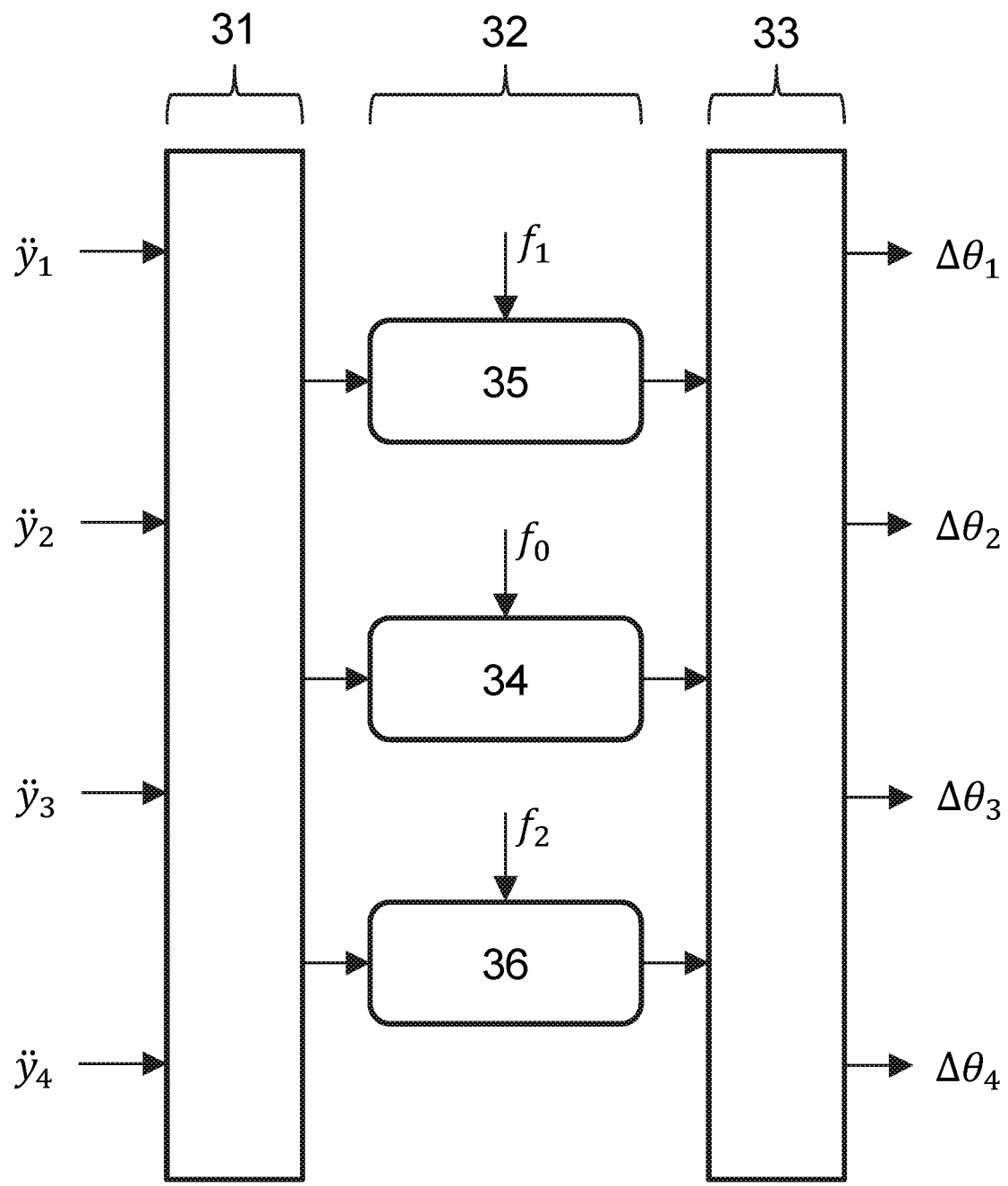
FIG. 6 shows a high level flow chart of the signal processing occurring in a further method according to the invention.

FIG. 6 shows a high level flow chart of the signal processing occurring in a further method according to the invention. In this embodiment, the wind turbine 100 comprises two sets of rotor arms 105 at different levels of the wind turbine tower 101. Accelerometers are associated with each one of the four nacelles 111, 121, 131, 141 of the wind turbine 100. The signals ($\ddot{y}_1$, $\ddot{y}_2$, $\ddot{y}_3$, $\ddot{y}_4$) from these four sensors are all gathered and pre-processed in the mode isolation stage 31 and then analysed in modal control stage 32. In addition to the already described data analysis modules 34, 35 for analysing fore-aft and tower torsion oscillation levels at a first height are installed, also a third data analysis module 36 is provided for analysing tower torsion oscillation levels at a second level. For this third data analysis module 36, and second tower torsion analysis module, a further characteristic frequency $f_2$ is used. Because the arms 105 for the third and fourth nacelles 131, 141 are at a different level than the arms 105 for the first and second nacelles 111, 121, the characteristic frequency $f_2$ of the second tower torsion analysis module 36 will differ from the characteristic frequency $f_1$ of the first tower torsion analysis module 35. At the combination stage 33 of this method, pitch adjustment signals ($\Delta\theta_1$, $\Delta\theta_2$, $\Delta\theta_3$, $\Delta\theta_4$) for the pitch control units of each respective rotor 110, 120, 130, 140 are provided.

Figure 7:
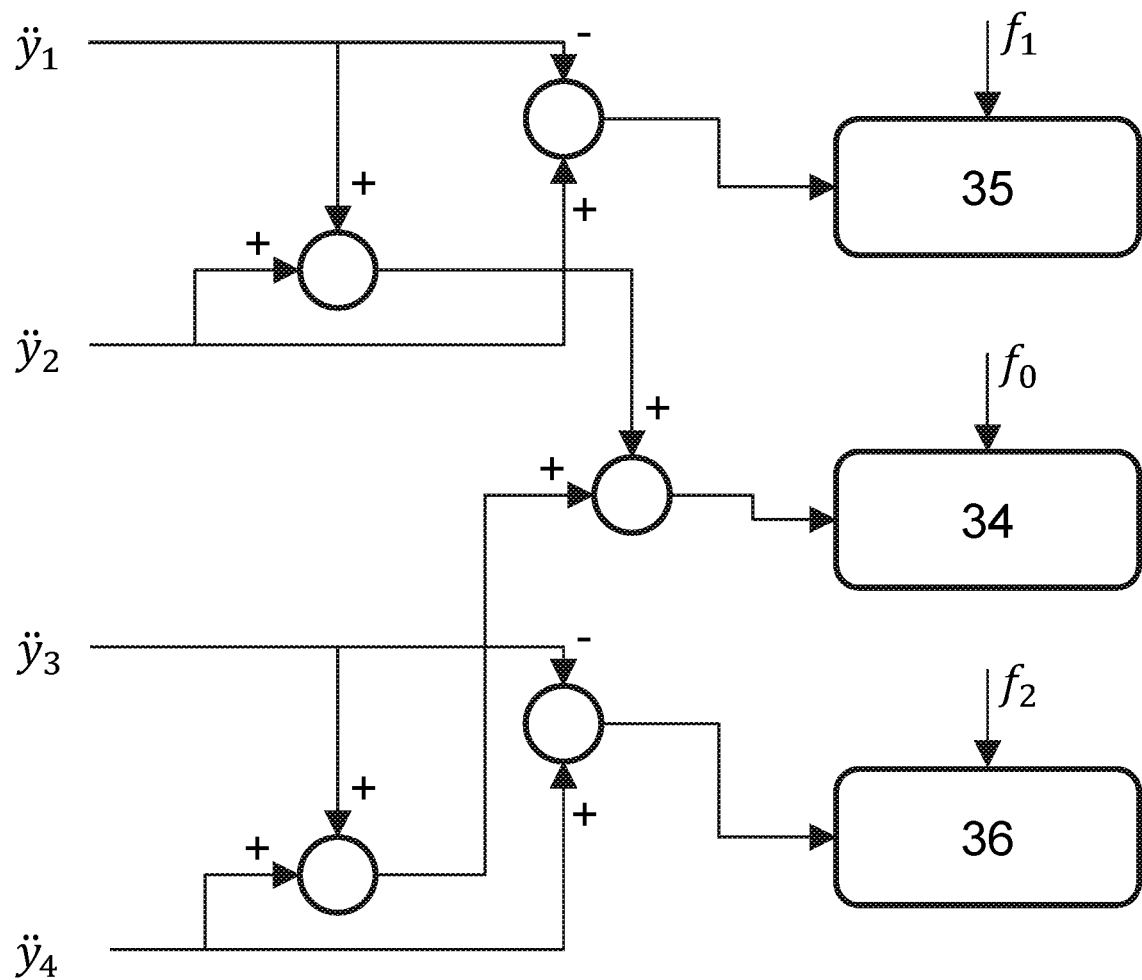
FIG. 7 schematically shows some of the signal processing of FIG. 6 in more detail.

FIG. 7 schematically shows some of the signal processing of FIG. 6 in more detail. Here it can be seen that the acceleration signals ($\ddot{y}_1$, $\ddot{y}_2$, $\ddot{y}_3$, $\ddot{y}_4$) from all four sensors are used for analysing fore-aft tower oscillation, while only acceleration signals from the nacelles at the same level are used for the tower torsion analysis.

It will be appreciated that preferred and/or optional features of the first aspect of the invention may be combined with the other aspects of the invention. The invention in its various aspects is defined in the independent claims below and advantageous features are defined in the dependent claims below.

The invention claimed is:

1. A method of damping oscillations in a multi-rotor wind turbine, the wind turbine comprising a wind turbine support structure and at least a first nacelle with a first rotor and a second nacelle with a second rotor, at least one of the nacelles being located at a position away from a central longitudinal axis of the wind turbine support structure, the method comprising:
   receiving motion data representing a movement of the first nacelle and of the second nacelle;
   processing the received motion data to determine at least two prominent oscillation modes of the wind turbine support structure;
   for each prominent oscillation mode selecting a corresponding damping algorithm;
   based on each one of the selected damping algorithms and the received motion data, generate a partial pitch control signal for a pitch controller of at least one of the rotors;
   combining the generated partial pitch control signals into a combined pitch control signal for the pitch controller of the at least one of the rotors; and
   based on the combined pitch control signal, instructing the respective pitch controller to adapt a pitch of the at least one of the rotors.

2. The method of claim 1, wherein the motion data further represents a movement of the wind turbine support structure.

3. The method of claim 1, wherein the motion data comprises position data, velocity data and/or acceleration data.

4. The method of claim 1, wherein:
   at least two rotor arms are attached to the wind turbine support structure, the first nacelle and the second nacelle being carried by the respective rotor arms;
   the motion data comprises acceleration signals from accelerometers associated with the respective nacelles;
   one of the at least two prominent oscillation modes is determined to be a tower torsion mode; and
   the corresponding damping algorithm for the tower torsion mode at least includes subtracting the acceleration signal of the first nacelle from the acceleration signal of the second nacelle.

5. The method of claim 4, wherein one of the prominent oscillation modes is determined to be a tower torsion mode, and one of the prominent oscillation modes is determined to be a tower fore-aft mode, wherein:
a first partial pitch control signal for the corresponding damping algorithm for the tower torsion mode at least includes subtracting the acceleration signal of the first nacelle from the acceleration signal of the second nacelle; and
a second partial pitch control signal for the corresponding damping algorithm for the tower torsion mode at least includes summing the acceleration signal of the first nacelle from the acceleration signal of the second nacelle.

6. The method of claim 5, wherein the generating of the pitch control signal includes applying a frequency filter based on a frequency window characteristic for the prominent oscillation mode of the respective damping algorithm.

7. The method of claim 1, wherein:
at least two rotor arms are attached to the wind turbine support structure, the first nacelle and the second nacelle being carried by the respective rotor arms;
the motion data comprises acceleration signals from accelerometers associated with the respective nacelles;
one of the at least two prominent oscillation modes is determined to be a tower fore-aft mode; and
the corresponding damping algorithm for the tower fore-aft mode at least includes summing the acceleration signal of the first nacelle and the acceleration signal of the second nacelle.

8. The method of claim 6, wherein the frequency filter is applied after the subtraction of the acceleration signals and after the summation of the acceleration signals.

9. The method of claim 6, wherein:
a first and a second rotor arm are attached to the wind turbine support structure at a first vertical level, the first nacelle and the second nacelle being carried by the respective rotor arms;
a third and a fourth rotor arm are attached to the wind turbine support structure at a second vertical level, a third nacelle with a third rotor and a fourth nacelle with a fourth rotor being carried by the respective rotor arms; and
a first prominent oscillation mode is determined to be a first level tower torsion mode, a second prominent oscillation mode is determined to be a second level tower torsion mode, the frequency window characteristic for the first level tower torsion mode being different from the frequency window characteristic for the second level tower torsion mode.

10. The method of claim 1, wherein:
at least two rotor arms are attached to the wind turbine support structure, the first nacelle and the second nacelle being carried by the respective rotor arms at substantially equal distances from the longitudinal axis,
the motion data is obtained by at least two motion sensors, located along the respective rotor arms,
a vibrational mode comprises a torsion mode and/or a fore-aft bending mode of the wind turbine support structure; and
determining a vibrational mode level includes combining motion signals from the at least two motion sensors in order to decouple a torsion signal from a fore-aft bending signal.

11. The method of claim 10, wherein each nacelle comprises an oscillation sensor for generating the motion data, and wherein the oscillation sensor is operatively coupled to an oscillation control unit for sending the motion data thereto.

12. The method of claim 11, further comprising a tower oscillation sensor, provided at the wind turbine support structure for generating the motion data based on mechanical oscillations of the wind turbine support structure, and wherein the tower oscillation sensor is operatively coupled to the oscillation control unit for sending the motion data thereto.

13. The method of claim 1, further comprising:
for each prominent oscillation mode determining a respective oscillation mode level;
comparing the determined oscillation mode levels to respective oscillation mode thresholds;
generating a shutdown request for shutting down the nacelles if at least one of the oscillation mode levels exceeds the oscillation mode threshold; and
sending the shutdown request to the pitch controllers of the rotors.

14. A multi-rotor wind turbine comprising:
a wind turbine support structure;
a first nacelle with a first rotor and a first pitch controller, operatively coupled to the first rotor for controlling the pitch thereof;
a second nacelle with a second rotor and a second pitch controller, operatively coupled to the second rotor for controlling the pitch thereof;
at least one of the nacelles being located at a position away from a central longitudinal axis of the wind turbine support structure; and
an oscillation control unit, operably coupled to the first and the second pitch controller and being configured to perform an operation of damping oscillations in the multi-rotor wind turbine, the operation comprising:
receiving motion data representing a movement of the first nacelle and of the second nacelle;
processing the received motion data to determine at least two prominent oscillation modes of the wind turbine support structure;
for each prominent oscillation mode selecting a corresponding damping algorithm;
based on each one of the selected damping algorithm and the received motion data, generating a partial pitch control signal for a pitch controller of at least one of the rotors;
combining the generated partial pitch control signals into a combined pitch control signal for the pitch controller of the at least one of the rotors; and
based on the combined pitch control signal instructing the respective pitch controller to adapt a pitch of the at least one of the rotors.

15. The multi-rotor wind turbine claim 14, wherein the motion data further represents a movement of the wind turbine support structure.

16. The multi-rotor wind turbine of claim 14, wherein the motion data comprises position data, velocity data and/or acceleration data.

17. The multi-rotor wind turbine of claim 14, wherein:
at least two rotor arms are attached to the wind turbine support structure, the first nacelle and the second nacelle being carried by the respective rotor arms;
the motion data comprises acceleration signals from accelerometers associated with the respective nacelles;
one of the at least two prominent oscillation modes is determined to be a tower torsion mode; and
the corresponding damping algorithm for the tower torsion mode at least includes subtracting the acceleration signal of the first nacelle from the acceleration signal of the second nacelle.

18. The multi-rotor wind turbine of claim 14, wherein:
at least two rotor arms are attached to the wind turbine support structure, the first nacelle and the second nacelle being carried by the respective rotor arms;
the motion data comprises acceleration signals from accelerometers associated with the respective nacelles;
one of the at least two prominent oscillation modes is determined to be a tower fore-aft mode; and
the corresponding damping algorithm for the tower fore-aft mode at least includes summing the acceleration signal of the first nacelle and the acceleration signal of the second nacelle.

19. The multi-rotor wind turbine of claim 18, wherein one of the prominent oscillation modes is determined to be a tower torsion mode, and one of the prominent oscillation modes is determined to be a tower fore-aft mode, wherein:
a first partial pitch control signal for the corresponding damping algorithm for the tower torsion mode at least includes subtracting the acceleration signal of the first nacelle from the acceleration signal of the second nacelle; and
a second partial pitch control signal for the corresponding damping algorithm for the tower torsion mode at least includes summing the acceleration signal of the first nacelle from the acceleration signal of the second nacelle.

* * * * *